United States Patent [19]
Hart et al.

[11] Patent Number: 5,005,915
[45] Date of Patent: Apr. 9, 1991

[54] EMPTY/LOAD CHANGEOVER VALVE FOR RAILWAY CAR

[75] Inventors: James E. Hart, Trafford, Pa.; Albert A. McKay, Stoney Creek, Canada

[73] Assignee: American Standard Inc., Wilmerding, Pa.

[21] Appl. No.: 481,414

[22] Filed: Feb. 20, 1990

[51] Int. Cl.[5] .............................................. B60T 8/18
[52] U.S. Cl. ................................. 303/22.2; 188/195; 303/22.7
[58] Field of Search ................. 303/22.2, 22.3, 22.7, 303/22.8; 188/195

[56] References Cited

U.S. PATENT DOCUMENTS

| | | |
|---|---|---|
| 2,068,342 | 1/1937 | McClure . |
| 3,376,080 | 4/1968 | Kettering et al. . |
| 3,671,086 | 6/1972 | Scott . |
| 4,080,005 | 3/1978 | Eagle . |
| 4,235,477 | 11/1980 | Hart . |
| 4,235,478 | 11/1980 | Billeter . |
| 4,291,923 | 9/1981 | Billeter . |
| 4,417,767 | 11/1983 | Billeter . |

*Primary Examiner*—Douglas C. Butler
*Attorney, Agent, or Firm*—G. J. Falce

[57] ABSTRACT

A dual capacity empty/load changeover valve for a railway freight car in which a piston-operated check valve controls the supply of compressed air delivered from the auxilary reservoir to the brake cylinder via the car control valve. The check valve is connected to a balance piston having equal opposing pressure areas, one of which is subject to the air supplied to the brake cylinder under all conditions of car loading. The opposing pressure area of the balance piston is pressurized in a load condition and depressurized in an empty condition, thereby establishing a proportional mode of brake control during empty car braking. A proportioning spring acts on the balance piston to establish the brake cylinder pressure at which the check valve becomes operative to proportion the air supplied to the brake cylinder. In one embodiment of the invention, the proportional spring exerts a fixed force and in another embodiment, the proportioning spring exerts a variable force on the balance piston according to the empty car load weight, so as to vary the ratio at which the brake cylinder pressure is proportioned.

31 Claims, 4 Drawing Sheets

EMPTY/LOAD CHANGEOVER VALVE FOR RAILWAY CAR

BACKGROUND OF THE INVENTION

The present invention relates to an empty/load type brake control system for a railway freight car and, more particularly, to an empty/load changeover valve device that employs a proportioning valve to load-adjust the brake cylinder pressure in the empty range of car weight.

Single capacity brake equipment produces a brake shoe force that is independent of car loading, thus making it difficult to achieve desirably higher braking ratios for a loaded car without exceeding an empty car braking ratio sufficient to cause wheel slide. Sliding wheels are undesirable from the standpoint of reduced braking retardation, and slid-flat wheels.

Special brake equipment is therefore necessary to increase the loaded car braking ratio without incurring the consequence of a wheel slide condition when braking an empty car. Such equipment automatically adjusts brake shoe force according to the load condition of the car. These special equipments fall into two primary categories, dual capacity empty/load braking and multiple capacity or continuously variable load braking.

In the dual capacity empty/load equipment, there are just two settings, one for "empty" braking and one for "load" braking, the changeover point between the "empty" and "load" settings being selected at some predetermined car weight, usually at 20% of the full load capacity weight. In arbitrarily selecting this changeover point, it will be appreciated that a given car can be generally under-braked by the reduced brake pressure when the car weight is in the upper end of the "empty" weight range, since essentially the same adhesion demand is available at the lower end of the "load" weight range at which maximum braking force is capable of being supported without sliding the car wheels.

In the variable load type equipment, braking pressure is proportioned according to the actual load, generally throughout the full range of car loading. It will be appreciated, however, that the proportioned brake pressure is selected in accordance with the maximum brake pressure (emergency) capable of being developed from the maximum running pressure normally carried by a train (110 psi.). Therefore, when making relatively light service brake applications or when making a maximum brake application from a relatively low running pressure (70 psi.), the proportioned brake pressure may be far less than that capable of being supported by the adhesion demand. Accordingly, less than optimum brake efficiency is realized under certain brake conditions with variable load type brake equipment, as well as single capacity equipment, in order to protect against wheel sliding on an empty car under maximum braking conditions.

In known dual capacity brake systems such as disclosed in U.S. Pat. No. 3,671,086, a proportioning valve arrangement is employed to reduce the braking pressure by a fixed ratio during empty car braking. In order to be compatible with the quick service limiting valve requirements for freight brake control valves, which assures that 8 to 12 psi. brake cylinder pressure will be developed from even the lightest service application, the aforementioned system withholds the empty/load sensing function until a predetermined minimum brake cylinder pressure has developed, generally 12 psi. However, since an equalizing volume is required in such proportional type dual capacity systems to maintain proper control valve operation, an inadvertent loss of braking pressure can occur when the empty/load changeover valve sensing function comes into play, due to the existing brake cylinder pressure being able to momentarily backflow into the equalizing volume. This occurs when a light service reduction is made, just sufficient to operate the load sensing valve on empty cars, in which case, the brake cylinder pressure can build up to 12 psi. and then be reduced back to the limiting valve pressure setting on each car, which can be as light as 8 psi. This is caused by the brake cylinder air flowing into the empty/load equalizing volume.

SUMMARY OF THE INVENTION

One object of the present invention is to provide a dual capacity empty/load changeover valve having a proportioning valve capable of operating in a proportioning mode during empty car braking and in a non-proportioning mode during load car braking.

Another object of the invention is to arrange the proportioning valve relative to an equalizing reservoir so as to prevent an inadvertent reduction of brake cylinder pressure when an equalizing reservoir is connected to the brake pressure supply system during empty car braking.

Another object of the invention is to vary the rate of proportioning of brake cylinder pressure according to the actual car weight in the empty braking range.

A final object of the invention is to prevent rock and roll undulations of a railway car from effecting transition of the changeover valve between its empty and load settings.

In accordance with the foregoing objectives, there is provided for use in a railway vehicle brake control system an empty/load changeover valve device mounted on one of the sprung and unsprung members of the vehicle. The brake control system further includes a brake pipe charged to a certain chosen pressure, an auxiliary reservoir charged to the pressure carried in the brake pipe, a brake cylinder, and a brake control valve device via which fluid under pressure is connected from the auxiliary reservoir to the brake cylinder and from the brake cylinder to atmosphere in accordance with variation of the brake pipe pressure. The changeover valve device includes load sensing means engageable with the other of said sprung and unsprung members for measuring the distance therebetween to provide an empty setting and a load setting of the changeover valve device depending upon this distance being greater or less than a predetermined distance corresponding to the changeover point between the empty and load settings. An inlet passage of the changeover valve device is connected to the control valve device and an outlet passage is connected to the brake cylinder. A check valve is engageable with a valve seat between the inlet and outlet passages in order to interrupt pressurization of the brake cylinder in a closed position and to permit such pressurization in an open position. A piston member having a seal separating equal opposing pressure areas is connected to the check valve, one of the pressure areas being subject to the pressure at the inlet passage. Empty/load valve means pressurizes the opposing pressure area when in the load setting of the changeover valve to maintain the check valve in a normally open position consistent with a non-proportional mode of operation and depressurizes this pressure area in the empty setting, whereby a pressure and force imbalance is established across the piston member in the empty setting in the direction of closure of the check valve to condition the check valve for a proportional mode of operation.

The foregoing objects and other features and advantages of the invention will be more readily understood from the following more detailed explanation when taken in conjunction with the accompanying drawings in which.

DESCRIPTION AND OPERATION

Figure 1:
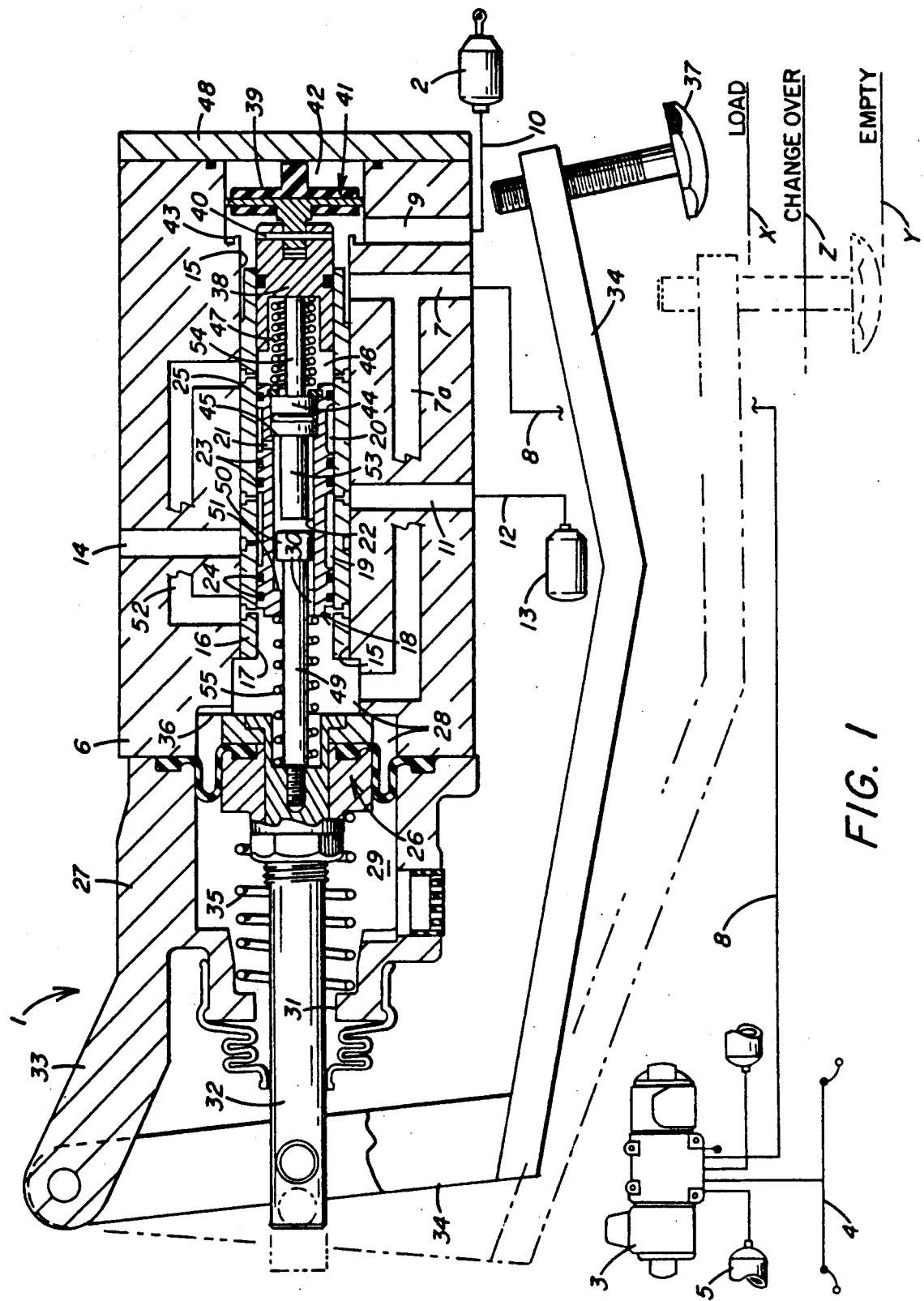
FIG. 1 is a schematic view of an empty/load brake control system showing the one embodiment of the changeover valve of the present invention in section.

In accordance with the present invention, there is shown in FIG. 1 an empty/load changeover valve device 1 interposed between a brake cylinder device 2 and a freight brake control valve device 3, such as a conventional ABDW type brake control valve device. As is well known, this control valve device 3 operates on the pressure equalization principle in response to reductions of the air pressure carried in a train brake pipe 4. An auxiliary reservoir 5 is charged to the pressure carried in brake pipe 4 and supplies air to brake cylinder device 2 in response to and in an amount dependent upon the reduction of brake pipe pressure, as controlled by control valve device 3. Pressure equalization exists between the compressed air in brake cylinder 2 and auxiliary reservoir 5 when a full service reduction of the brake pipe pressure is made.

The main body 6 of changeover valve device 1 is provided with an inlet passage 7 that is connected by a brake cylinder supply pipe 8 to control valve device 3, an outlet passage 9 that is connected by a delivery pipe 10 to brake cylinder device 2, a passage 11 that is connected by a pipe 12 to an equalizing reservoir 13, and a vent passage 14 that is open to atmosphere.

Main body 6 further includes a bore 15 in which a bushing 16 is fixed, the respective passages 11 and 14 being connected to a bore 17 of bushing 16 in which a spool valve 18 is axially disposed. Surrounding the periphery of spool valve 18 are annular grooves 19 and 20, groove 20 having a connecting port 21 leading to a stepped bore 22 of spool valve 18. A pair of O-ring seals 23 provide a pressure seal between grooves 19 and 20, while another set of O-ring seals 24 provide a pressure seal between groove 19 and the left-hand side of spool valve 18, and an O-ring seal 25 provides a pressure seal between groove 20 and the right-hand side of spool valve 18.

A diaphragm type actuating piston 26 is clamped between main body 6 and an end body 27 to form on one side an actuating chamber 28 and on the other side a vent chamber 29. Actuating chamber 28 is communicated with stepped bore 22 of spool valve 18 via an opening 30 in the left-hand end of the spool valve, and with inlet passage 7 via a branch passage 7a.

Projecting through an opening 31 in end body 27 is a push rod 32 of actuating piston 26. An extension 33 of end body 27 pivotally supports a sensor arm 34 to which push rod 32 is connected to effect rotation of the sensor arm in response to operation of the actuating piston against the resistance of a retracting spring 35 in vent chamber 29. In its retracted position, actuating piston 26 is engaged with a stop provided by a flange 36 of main body 6, and an adjusting screw 37 of sensor arm 34 is displaced from an unsprung member, such as a railway car side frame, under all load conditions. Reference line X indicates the position of the car side frame relative to the car body (on which changeover valve device 1 is assumed to be mounted) in a fully loaded condition of car weight. Reference line Y indicates the position of the car side frame relative to the car body in a completely empty condition of car weight. A changeover point Y is selected representing the car weight at which transition occurs between an empty or load condition of car weight.

Aligned axially in bore 17 adjacent the right-hand side of spool valve 18 is a balance piston 38 to which a check valve 39 is connected, as by a roll pin 40, for example. Balance piston 38 and check valve 39 each have equal opposing pressure areas and comprise a proportioning valve 41 that may be controlled to operate in either a proportioning mode or in a non-proportioning mode. Check valve 39 includes an annular disc valve element that is guidably disposed in a cavity 42 formed in main body 6 at the right-hand side of bore 15 and into which cavity bore 17 opens. The disc valve element of check valve 39 is arranged to engage and disengage an annular valve seat 43 formed between bore 15 and cavity 42 on the upstream side of check valve 39. Inlet passage 7 opens into bore 15 at one side of valve seat 43 and outlet passage 9 opens into cavity 42 at the other side of valve seat 43. Accordingly, closure of check valve 39, by engagement with valve seat 43, interrupts the flow of compressed air between control valve device 3 and brake cylinder device 2, and the opening of check valve 39, by disengagement of check valve 39 from valve seat 43, establishes this flow path.

Stepped bore 22 of spool valve 18 is closed by a sealed end plug 44 that is held in place against a shoulder 45 of stepped bore 22 by a snap ring.

Formed in bore 17 between this closed end of spool valve 18 and balance piston 38 is a balancing chamber 46 in which is disposed a proportioning spring 47 that acts between the end plug and balance piston 38. A cover 48 closes cavity 42 and serves as a stop against which check valve element 39 rests in its open position.

Spool valve 18 is connected to actuating piston 26 through a lost-motion connection therebetween. This lost-motion connection is provided by a connecting stem 49 that is fixed to actuating piston 26 at its one end and is formed with a head 50 at its other end that projects into stepped bore 22.

Head 50 of connecting stem 49 is axially spaced-apart from a shoulder 51 of stepped bore 22 when the actuating piston 26 is in contact with its limit stop 36 in the retracted position of sensor arm 34, and spool valve member 18 is in its rightward-most position, as shown. This distance between head 50 and shoulder 51 corresponds to the distance adjusting screw 37 of sensor arm 34 is retracted from the railway car side frame when the car is in a full load condition of car weight, as represented by line X. Thus, stem 49 of actuating piston 26 is free to move leftward from its shown position without imparting movement of spool valve 18 until the sensor arm 34 rotates through a range of travel sufficient to establish engagement with a fully loaded car side frame. In this manner, sensor arm 34 can be fully retracted to its shown position without requiring corresponding travel of spool valve member 18, so that the main body 6 housing the spool valve member 18 and bushing 16 can be limited in size.

In the shown position of spool valve member 18, a passage 52 has its ports in bushing 16 terminating at bore 17 on opposite sides of spool valve 18 to communicate actuating chamber 28 and balancing chamber 46. Also in this shown position, head 50 of connecting stem 49 is spaced-apart from a stem 53 that projects from one side of end plug 44 into stepped bore 22. Another stem 54 that projects from the opposite side of end plug 4 into the balancing chamber 46 is adapted to engage balance piston 38 of the proportioning valve 41 to unseat check valve 39 from seat 43. In order to locate and maintain spool valve 18 in its rightward-most position shown until such time as the actuating piston 26 pulls spool valve 18 leftwardly through its lost-motion connection therewith, a positioning spring 55 is provided between actuating piston 26 and spool valve 18. This positioning spring 55 is stronger than proportioning spring 47 to counteract the opposing proportioning spring force acting on spool valve 18.

BRAKE APPLICATION ON LOADED CAR

When a brake application is made by reducing the brake pipe pressure in a well-known manner, control valve device 3 connects air from the auxiliary reservoir 5 to brake cylinder supply pipe 8. The air supplied to pipe 8 is connected directly to brake cylinder 2 via inlet passage 7, open check valve 39, outlet passage 9 and pipe 10, and also to actuating chamber 28 via inlet passage 7 and branch passage 7a.

In the rightward-most position in which spool valve 18 is normally maintained by positioning spring 55, the air admitted to actuating chamber 28 is connected to balancing chamber 46 via passage 52 to balance the brake cylinder air pressure acting on the opposite side of balance piston 38. The opposing equal pressure areas of check valve 39 are also subject to the brake cylinder pressure effective in cavity 42. Accordingly, proportioning valve 41 is force-balanced by the effective air loading, but is biased by proportioning spring 47 to maintain check valve 39 open. Consequently, the proportioning valve 41 is conditioned to operate in its non-proportioning mode, i.e., without reducing the pressure supplied to brake cylinder 2 via pipe 8.

As the brake cylinder pressure builds up, the corresponding pressure admitted to actuating chamber 28 acts on actuating piston 26. When the force of this pressure overcomes the opposing force of retraction spring 35, the sensor arm 34 is forced by push rod 32 to rotate about its pivot connection with extension 33 of end body 27 until adjusting screw 37 encounters the car side frame.

As long as the car weight is in the load range, such that the position of the car side frame relative to the car body is between the full load and changeover points represented by lines X and Z, connecting stem 49 will move with actuating piston 26 only sufficiently to allow head 50 to pick up shoulder 51 and pull spool valve 18 in a leftward direction a limited distance corresponding to the degree of rotation of sensor arm 34. This limited distance spool valve 18 moves is within its load range of travel, wherein O-rings 24 remain positioned on the right-hand side of the port of passage 52 via which balancing chamber 46 continues to be pressurized. Also, equalizing reservoir 13 is vented via passage 11, spool groove 19 and vent passage 14. Although proportioning spring 47 becomes increasingly relaxed with this leftward movement of spool valve 18, sufficient force is still provided to maintain check valve 39 in its open position through the entire load range of travel of spool valve 18. Brake cylinder pressure thus corresponds to the pressure supplied to pipe 8 via control valve device 3.

Figure 2:
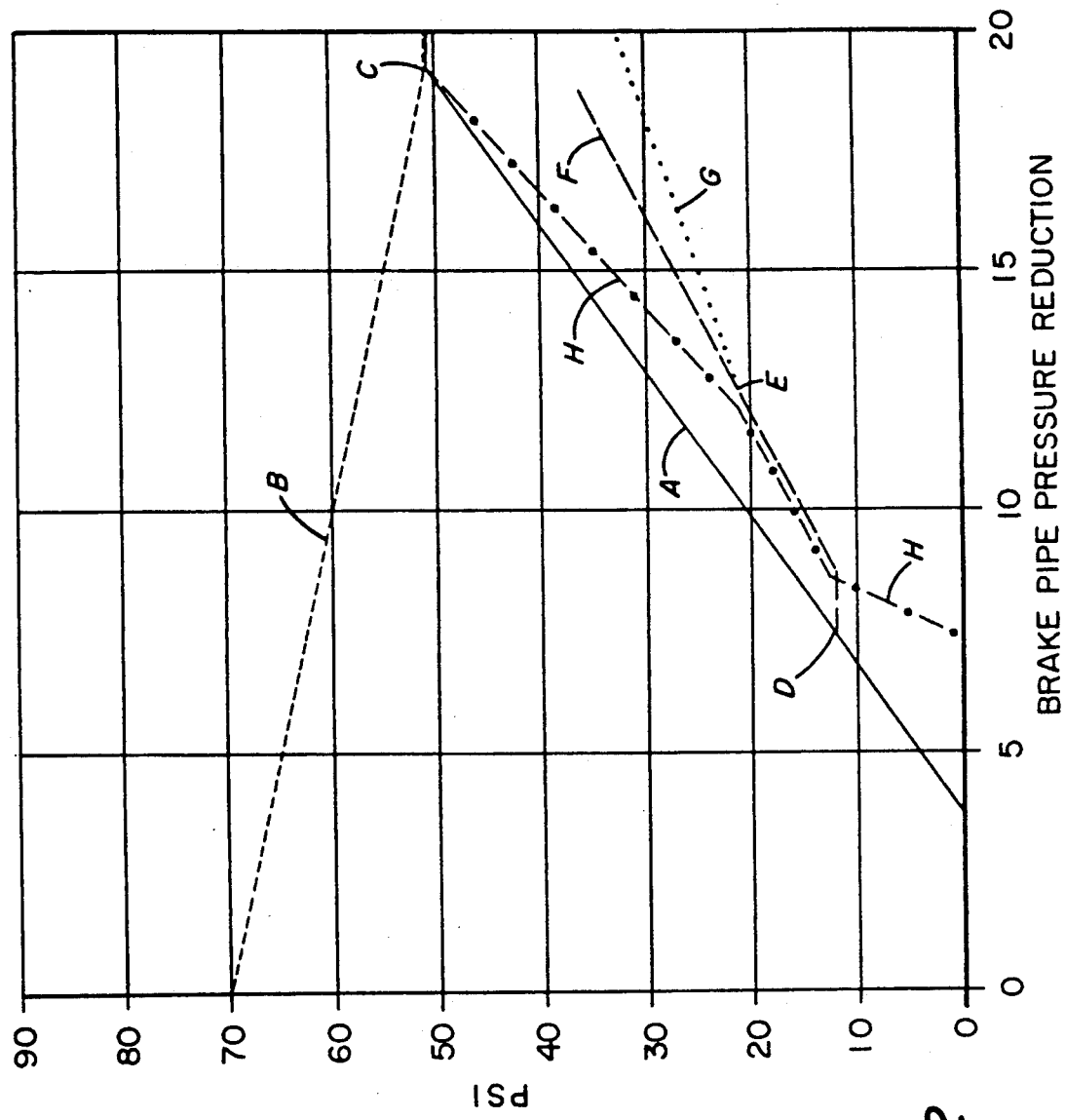
FIG. 2 is a graph showing the empty and load controlled buildup of brake pressures when a variable output proportioning spring is employed, as shown in the embodiment of FIG. 1.

In the graph of FIG. 2, this direct or non-proportioned supply of brake cylinder pressure is represented by solid line A, which can be seen to increase as the brake pipe pressure represented by solid line B decreases, until at point C, pressure equalization occurs.

When a brake release is desired, brake pipe pressure is increased in a well-known manner to cause control valve device 3 to vent supply pipe 8. With check valve 39 being maintained in its open position, as explained, the air in brake cylinder 2 is released via outlet passage 9, open check valve 39, inlet passage 7, and the vented supply pipe 8.

BRAKE APPLICATION ON EMPTY CAR

Referring to FIG. 1, when the load sensor arm 34 is able to rotate sufficiently that adjusting screw 37 is deflected beyond the empty/load changeover point represented by line Z before encountering the car side frame, the car weight is indicated as being in the empty range of car loading. Actuating piston 26 consequently pulls spool valve 18 further leftward into its empty range of travel in which O-rings 24 cut off registry of passage 52 with actuating chamber 28, and spool groove 19 establishes registry between passages 52 and 14. The air supplied to balancing chamber 46 is thus interrupted and chamber 46 is concurrently vented via passage 52, spool groove 19, and vent passage 14, thereby de-pressurizing balancing chamber 46. This results in an unbalanced air load across balance piston 38 in the direction of closure of check valve 39 to establish the proportioning mode of operation of proportioning valve 41.

At the same time, spool groove 20 is registered with passage 11 to connect air from supply pipe 8 to equalizing reservoir 13 via inlet passage 7, branch passage 7a, actuating chamber 28, opening 30 and stepped bore 22, connecting port 21, spool groove 20, passage 11 and pipe 12. This supply of air from pipe 8 to equalizing reservoir 13 occurs in parallel with the supply of air to brake cylinder 2 via proportioning valve 41. Although proportioning valve 41 is conditioned to operate in a proportional mode, as explained, until the brake cylinder pressure effective in cavity 42 is sufficient to overcome the force of proportioning spring 47, check valve 39 will continue to be held open and no proportioning of the brake cylinder pressure will yet occur. However, the brake cylinder pressure will be somewhat modulated by virtue of the volumetric expansion of auxiliary reservoir 5 with equalizing reservoir 13. This modulated buildup of brake cylinder pressure thus depends upon the volume of equalizing reservoir 13, which, in turn, is selected so that following a proportioned full service brake application, the interconnected equalizing reservoir and auxiliary reservoir pressures will be substantially the same as the brake pipe pressure, as represented at point C in the graph of FIG. 2. From an initial charge of 70 psi., this equalization will occur between approximately 48 psi. and 52 psi.

As can also be seen from the graph of FIG. 2, the point D, at which the direct buildup of brake cylinder pressure effective in actuating chamber 28 is sufficient to cause the actuating piston 26 to overcome the force of retracting spring 35, corresponds to approximately 12 psi. Until the brake cylinder pressure builds up to approximately 20 psi., however, the differential force on balance piston 38 is insufficient to overcome the force of proportioning spring 47. Consequently, the brake cylinder pressure buildup is modulated between points D and E, as represented by dashed line F, due to equalizing reservoir 13 being pressurized in parallel with brake cylinder 2. At point E, the modulated brake cylinder pressure effective in cavity 42 builds up sufficiently to cause proportioning valve 41 to move against proportioning spring 47 and thereby effect closure of check valve 39. This initiates a proportioning phase of the brake cylinder pressure buildup, as represented by dotted line G in the graph of FIG. 2.

During this proportioning phase of the brake pressure buildup, the supply of air to brake cylinder 2 via supply pipe 8 is reduced by the action of proportioning valve 41 according to the differential air load across balance piston 38 and check valve 39 offset by the force exerted by proportioning spring 47 according to the particular car load condition that might exist. It should be noted at this point that in the closed position of check valve 39, a differential pressure area is subject to the air in supply pipe 8, as determined by the difference in diameter between balancing piston 38 and the diameter of check valve 39 within the area defined by valve seat 43. In this manner, a rightward acting force differential is exerted on proportioning valve 41 to effect opening of check valve 39 in response to a further increase of brake cylinder supply pressure when it is desired to increase a partial brake application.

The following table is a tabulation of a range of input pressures $P_i$ and the corresponding output pressures $P_o$ resulting from operation of proportioning valve 41 under different vehicle load conditions in the empty/load range, as represented by the different effective forces S of proportioning spring 47.

|  | $P_i$ | $P_o$ | | | |
|---|---|---|---|---|---|
|  |  | S = 6.136 | S = 8.0 | S = 10.0 | S = 11.3 |
|  | 20 | 20 | — | — | — |
|  | 26 | 22 | 26 | — | — |
|  | 32.6 | 24.6 | 28.2 | 32.6 | — |
|  | 36.83 | 25.6 | 29.7 | 34.0 | 36.8 |
|  | 50.4 | 30.13 |  |  |  |
| equal- | 49.52 |  | 33.84 |  |  |
| ization | 48.6 |  |  | 37.9 |  |
| pressures | 48.0 |  |  |  | 40.6 |

The foregoing pressures $P_i/P_o$ may be calculated from the following balance equation for proportioning valve 41:

$$(A_2 - A_1) P_i + S = A_2 \cdot P_o \quad (1)$$

where $P_i$ = brake cylinder supply pressure at passage (7)
$P_o$ = brake cylinder delivery pressure at passage (9)
$A_1$ = area of balance piston (38) subject to pressure $P_i$
$A_2$ = area of valve seat (43)
$S$ = force of spring (47)

letting $A_1$ = .3068 sq. in., and
$A_2$ = .4602 sq. in.

equation (1) becomes:
$$.1534 P_i + S = .4602 P_o \quad (2)$$
solving for $P_o$, equation (2) becomes:

$$P_o = \frac{P_i + 6.519 \cdot S}{3} \quad (3)$$

The slope of line G in the graph of FIG. 2 represents the proportioned brake cylinder pressure as a percentage of the modulated brake cylinder supply pressure effective at inlet passage 7 and represented by dashed line F. Dash-dot line H in the graph of FIG. 2 represents the pressure in equalizing reservoir 13.

Figure 3:
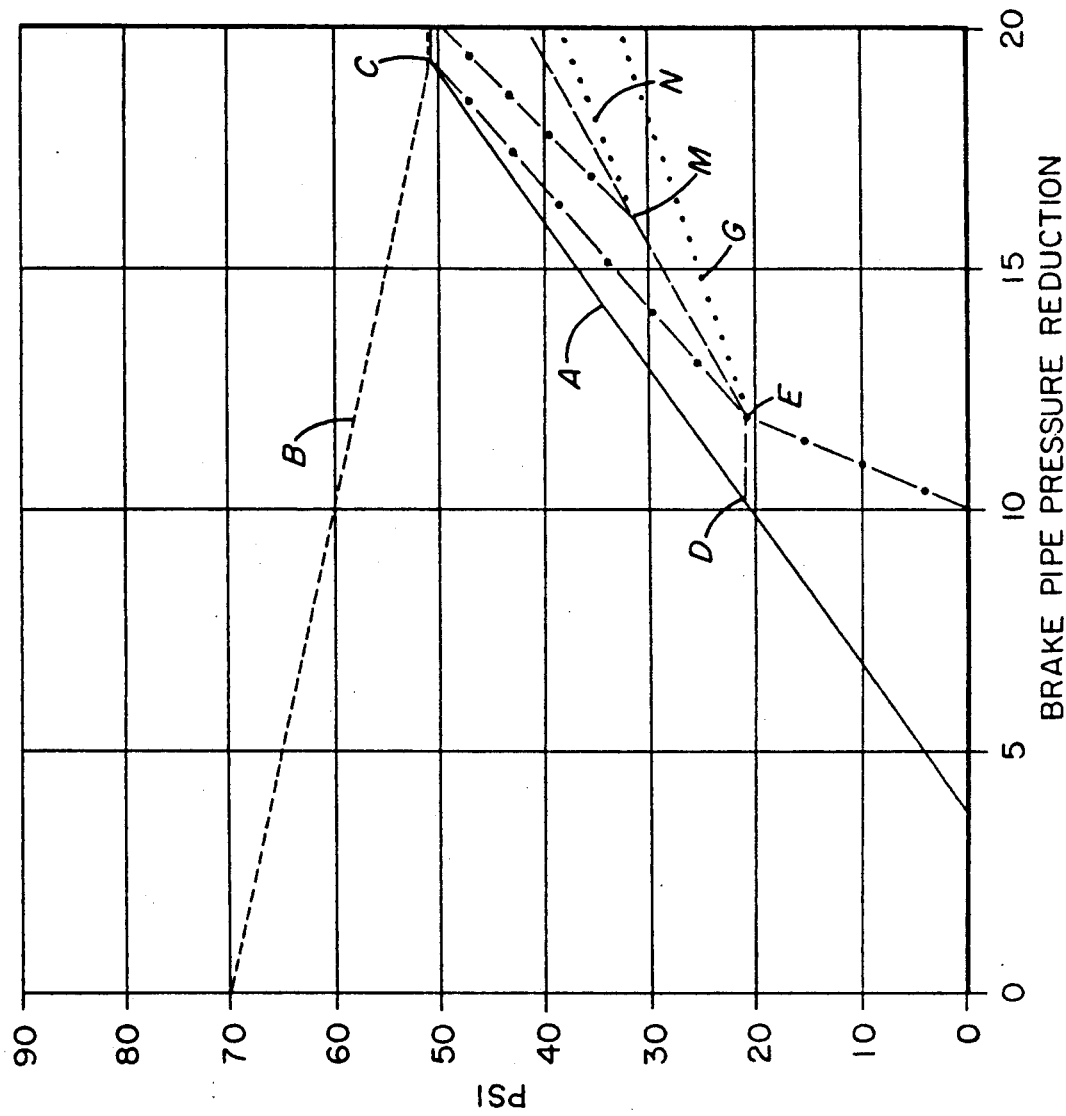
FIG. 3 is a graph showing the empty and load controlled buildup of brake pressures when the load sensing and empty car proportioning functions occur concurrently.

Shifting of spool valve 18 into its empty range of travel can be made to occur concurrently with closure of proportioning valve 41 by selecting retracting spring 35 to resist operation of actuating piston 26 until the pressure in actuating chamber 28 reaches the pressure at which proportioning valve 41 is closed against the force of proportioning spring 47. This is illustrated in the graph of FIG. 3 where it can be seen that point D and point E occur at the same pressure (20 psi.).

Being located on the upstream side of brake cylinder device 2, it will be appreciated that check valve 39 will prevent any backflow of air from brake cylinder 2 when equalizing reservoir 13 is initially connected to inlet passage 7 in response to actuating piston 26 pulling spool valve 18 into its empty range of travel, as indicated at point D in the graph of FIG. 2. This prevents any drop in the effective brake cylinder pressure while the equalizing reservoir pressure is building up to the effective brake cylinder pressure. Should the pressure at inlet passage 7 tend to drop when equalizing reservoir 13 is cut in, the resultant pressure reversal will effect closure of check valve 39 and thereby isolate brake cylinder 2 from equalizing reservoir 13.

Proportioning spring 47 exerts a variable force on proportioning valve 41 depending upon the actual position of spool valve 18 in its empty range of travel, as determined by the degree of sensor arm rotation required before adjusting screw 37 encounters the car side frame. If, for example, the adjusting screw 37 encounters the car side frame just beyond the changeover point in the empty range of car weight, the degree of compression of proportioning spring 47 will approach a maximum due to minimal leftward movement of spool valve 18 into the empty range of travel. On the other hand, if the car weight is such that the adjusting screw 37 fails to encounter the car side frame until it is at the other end of the empty range, the degree of compression of proportioning spring 47 will be substantially reduced, due to further leftward movement of spool valve 18 into the empty range of travel. The force exerted on proportioning valve 41 by proportioning spring 47 will thus vary with the degree of spring compression, such that the proportioned brake cylinder pressure will be greater for heavier car weights than for lighter car weights within the empty car brake range. This is due to the fact that the greater spring force withholds operation of proportioning valve 41 until a higher brake cylinder pressure is developed before proportioning action commences. In the graph of FIG. 3, for example, point M represents the pressure at which proportioning valve operation commences under the influence of a proportioning spring that reflects a car weight in the higher end of the empty range; whereas point E represents the pressure at which proportioning valve operation commences in accordance with compression of proportioning spring 47 corresponding to a car weight in the lower end of the empty range of car loading. It can be seen that the proportioned brake cylinder pressure on the empty car having the heavier load weight, as represented by line N, is greater than the proportioned brake cylinder pressure on a lighter empty car, as represented by line G.

In accordance with the foregoing, the effect of proportioning spring 47 should now be clear in terms of achieving different levels of proportional brake cylinder pressure for a given brake application, depending upon the actual weight of a railway car that is conditioned for empty car braking.

In providing a double O-ring seal 23 and 24 on opposite sides of spool valve groove 19, changeover valve device 1 is prevented from transitioning between its empty and load setting due to car body rock and roll. The distance between the pair of O-rings comprising each O-ring seal 23 and 24 provides a deadband zone within which spool valve 18 can move between its empty and load ranges of travel due to car rock and roll without changing the existing load setting. Adjusting screw 37 is set so that at the selected changeover point Z of sensor arm 34, spool valve 18 is located in a neutral position within the deadband zone by engagement of head 50 of connecting stem 49 with shoulder 51. In this deadband zone, O-rings 23 are located on opposite sides of the bushing port of passage and O-rings 24 are located on opposite sides of the bushing port of passage 52. When spool valve 18 is shifted from its load range into the deadband zone, the O-ring 24 on the left-hand side of the port of passage 52 cuts off supply of pressure to balance chamber 46, while O-ring 23 on the right-hand side of the port of passage 52 continues to cut off venting of balance chamber 46 via spool groove 19 and vent passage 14. Similarly, O-ring 23 on the left-hand side of the port of passage 11 cuts off venting of equalizing reservoir 13 via spool groove 19 and vent passage 14, but O-ring 23 on the right-hand side of the port of passage 11 continues to cut off pressurization of equalizing reservoir 13. It will be appreciated, therefore, that the spool valve porting necessary to establish the empty setting of changeover valve device 1, as previously explained, can only be achieved by spool valve movement through the deadband zone, as determined by the O-ring on the right-hand side of each pair of O-ring seals 23 and 24 crossing the respective ports of passages 11 and 52. The deadband range of spool valve travel is such as to accommodate typical rock and roll undulations of a railway car.

When spool valve 18 is within its empty range, in which both O-rings of the respective O-ring seals 23 and 24 are on the left-hand side of the port of passages 11 and 52, rightward movement of spool valve 18 in response to car rock and roll will be insufficient to move spool valve 18 through its deadband zone into the load range, and thus the existing empty load setting of changeover valve device 1 will be preserved.

When a brake release is desired, brake pipe pressure is increased in a well-known manner to cause control valve device 3 to vent supply pipe 8. Consequently, the air under check valve 39 within the area of valve seat 43 on which check valve 39 is seated, is vented with the air in supply pipe 8. While this reinforces the closure force on check valve 39, the air in actuating chamber 28 is also being vented via pipe 8, allowing retracting spring 35 to move actuating piston 26 toward its stop 36. Prior to actuating piston 26 engaging stop 36, however, head 50 of connecting stem 49 engages stem 53 of spool valve end plug 44 and moves spool valve 18 with it in a rightward direction. Stem 54 of end plug 44, in turn, engages balancing piston 38 to force check valve 39 off its seat 43 against the check valve closure force. This unseating of check valve 39 allows the differential pressure on check valve 39 to equalize, whereby proportioning spring 47 is effective to force balance piston 38 and check valve 39 into engagement with cover 48 and, accordingly, maintain proportioning valve 41 in its open position. The air in brake cylinder 2 is accordingly released via pipe 10, unseated check valve 39, inlet passage 7, pipe 8, and control valve 3.

Concurrently with opening of check valve 39, as explained, spool valve 18 is shifted to its rightward-most position in which balancing chamber 46 is re-pressurized to establish the direct or non-proportioning mode of operation of proportioning valve 41, and equalizing reservoir 13 is vented preparatory to a subsequent brake application.

Figure 4:
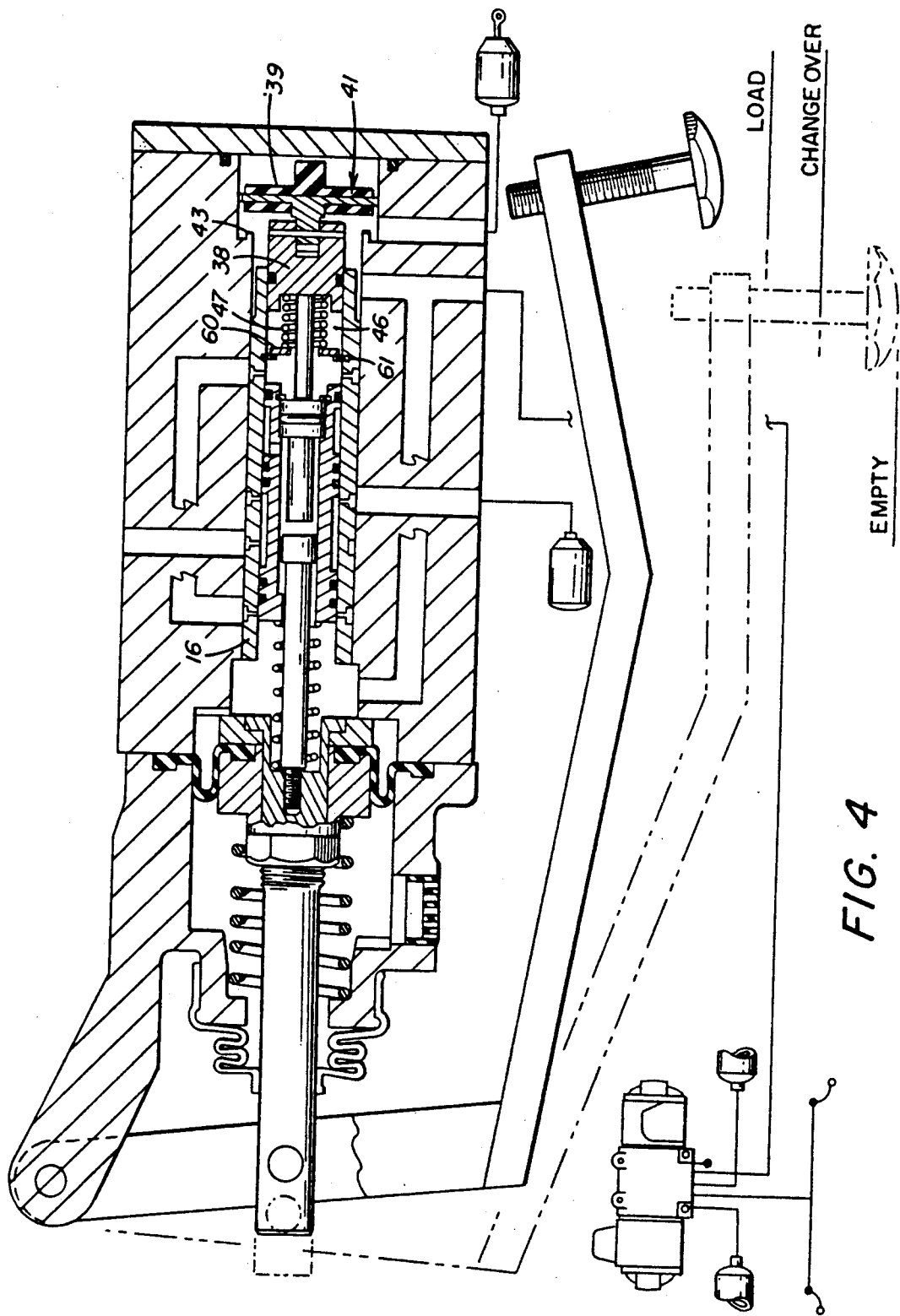
FIG. 4 is a partial sectional view of an alternate embodiment of the changeover valve of FIG. 1 employing a constant output proportioning spring.

In the alternate embodiment of changeover valve device 1, as shown in FIG. 4, proportioning spring 47 is disposed in balancing chamber 46 between balance piston 38 and a spring seat 60 that is supported on bushing 16 by a retaining ring 61. In this manner, the spring force acting on proportioning valve 41 is fixed, as opposed to being variable with the car weight in the empty setting, as in the embodiment of FIG. 1.

Proportioning spring 47 in this embodiment influences proportioning valve 41 in a similar manner as does the variable spring in the embodiment of FIG. 1, except that the proportioning ratio is the same for all car weights within the empty car setting. Accordingly, no further explanation is deemed necessary.

This fixed spring arrangement offers the additional advantage of eliminating the variable pressure range between points E and M of the graph of FIG. 3, in which equalizing reservoir 13 is pressurized prior to proportioning valve 41 operating. In positively correlating the pressure at which proportioning valve 41 operates, with the load weighing function, the volume of equalizing reservoir 13 can be more accurately selected, as compared to the embodiment of FIG. 1, where operation of proportioning valve 41 commences at different pressures according to the car load condition. In this manner, the auxiliary reservoir and equalizing reservoir pressures correspond to brake pipe pressure when a full service brake application is in effect to thereby provide for optimal brake control.

We claim:

1. For use in a railway vehicle brake control system including a brake pipe charged to a certain chosen pressure, an auxiliary reservoir charged to the pressure carried in said brake pipe, a brake cylinder device, and a brake control valve device via which fluid under pressure is supplied from said auxiliary reservoir to said brake cylinder device and released therefrom in accordance with variation of the fluid pressure in said brake pipe, an empty/load changeover valve device mounted on one of the sprung and unsprung members of said vehicle comprising:
- (a) load sensing means engageable with the other of said sprung and unsprung members for measuring the distance therebetween to provide an empty setting and a load setting of said changeover valve device depending upon said distance being greater or less than a predetermined distance corresponding to the changeover point between said empty and load settings;
- (b) an inlet passage connected to said control valve device and an outlet passage connected to said brake cylinder device;
- (c) a valve seat between said inlet and outlet passages;
- (d) a check valve between said valve seat and said outlet passage, said check valve being engageable with said valve seat in a closed position to interrupt the supply of fluid under pressure to said brake cylinder device and disengageable therefrom in an open position to conduct the supply of fluid under pressure to said brake cylinder device;
- (e) a balance piston to which said check valve is connected having equal opposing pressure areas, one of said pressure areas being subject to the fluid pressure effective at said inlet passage; and
- (f) empty/load valve means for pressurizing the other of said pressure areas in said load setting of said changeover valve device to establish a fluid pressure force balance across said balance piston, and for depressurizing said other pressure area in said empty setting to establish a differential fluid pressure force across said balance piston in the direction of engagement of said check valve with said valve seat.

2. An empty/load changeover valve device, as recited in claim 1, further comprising:
- (a) an equalizing reservoir; and
- (b) said empty/load valve means further establishing fluid pressure communication between said inlet passage and said equalizing reservoir in said empty setting of said changeover valve device, and for venting said equalizing reservoir in said load setting.

3. An empty/load changeover valve device, as recited in claim 1, further comprising:
- (a) said empty/load valve means being a spool valve member; and
- (b) said load sensing means including:
  - (i) a sensing arm;
  - (ii) a fluid pressure operated piston abutment connected to said sensing arm and subject to fluid under pressure effective at said inlet passage to urge said sensing arm toward said engagement with the other of said sprung and unsprung members; and
  - (iii) means for connecting said piston abutment to said spool valve member.

4. An empty/load changeover valve device, as recited in claim 3, further comprising:
- (a) an actuating chamber in which said piston abutment is operably disposed;
- (b) a branch passage between said inlet passage and said actuating chamber; and
- (c) a main bore opening into said actuating chamber in which said spool valve member is operable to a first position when said changeover valve device is in said load setting.

5. An empty/load changeover valve device, as recited in claim 4, wherein said means for connecting said piston abutment to said spool valve member comprises a lost-motion connection therebetween.

6. An empty/load changeover valve device, as recited in claim 5, wherein said lost-motion connection comprises:
- (a) said spool valve member having a stepped bore opening into said actuating chamber;
- (b) a shoulder of said stepped bore; and
- (c) a stem fixed at one end of said piston abutment and projecting into said stepped bore, said stem including a head engageable with said shoulder in one direction of movement of said piston abutment in response to pressurization of said actuating chamber and disengageable from said shoulder in the opposite direction of movement of said piston abutment.

7. An empty/load changeover valve device, as recited in claim 6, further comprising:
- (a) a limit stop;
- (b) retracting spring means for urging said piston abutment in a direction opposite said one direction toward engagement with said limit stop to provide a retracted position of said load sensing means, in which retracted position said sensing arm is retracted from said other of said sprung and unsprung members;
- (c) said head of said stem being spaced-apart from said shoulder in said first position of said spool valve member a distance corresponding to the distance said sensing arm is retracted from said other of said sprung and unsprung members in said retracted position of said load sensing means; and
- (d) means for urging said spool valve member toward said first position.

8. An empty/load changeover valve device, as recited in claim 7, wherein said spool valve member is operable axially through a first range of travel including said first position corresponding to said load setting of said changeover valve device following engagement of said head of said stem with said shoulder, so long as said measured distance is less than said predetermined distance.

9. An empty/load changeover valve device, as recited in claim 8, wherein said spool valve member is operable axially through a second range of travel corresponding to said empty setting of said changeover valve device following engagement of said head of said stem with said shoulder in accordance with said measured distance being greater than said predetermined distance.

10. An empty/load changeover valve device, as recited in claim 9, wherein said balance piston is operably disposed in said main bore adjacent said spool valve member.

11. An empty/load changeover valve device, as recited in claim 10, further comprising:
- (a) an equalizing reservoir; and
- (b) said empty/load valve means further establishing fluid pressure communication between said inlet passage and said equalizing reservoir in said empty setting of said changeover valve device, and for venting said equalizing reservoir in said load setting.

12. An empty/load changeover valve device, as recited in claim 11, wherein the diameter of said check valve within the area defined by said valve seat is greater than the diameter of said balance piston, so that upon engagement of said check valve with said valve seat, a differential pressure area of said proportioning valve is subject to fluid pressure at said inlet passage to urge said disengagement of said check valve from said valve seat.

13. An empty/load changeover valve device, as recited in claim 12, wherein said spool valve member in said first position thereof is engageable with said balance piston to effect disengagement of said check valve from said valve seat.

14. An empty/load changeover valve device, as recited in claim 13, further comprising a cover member closing said main bore, said check valve element in said open position being engageable with said cover to establish said first position of said spool valve member.

15. An empty/load changeover valve device, as recited in claim 14, further comprising release control means for effecting said disengagement of said check valve element from said valve seat in response to the release of fluid under pressure from said actuating chamber sufficient to allow said retracting spring means to move said piston abutment toward said limit stop.

16. An empty/load changeover valve device, as recited in claim 15, wherein said release control means comprises:
    (a) an end plug fixed in said stepped bore, one end of said end plug being engageable with said balance piston; and
    (b) said head of said stem being engageable with the other end of said end plug when said actuating piston is moved toward engagement with said limit stop to thereby effect said disengagement of said check valve from said seat.

17. An empty/load changeover valve device, as recited in claim 16, wherein said head of said piston when said piston abutment is engaged with said limit stop and said spool valve is in said first position is spaced-apart from said other side of said end plug a distance less than the distance that said check valve element is disengaged from said seat in said open position thereof.

18. An empty/load changeover valve device, as recited in claim 13, further comprising a proportioning spring having one end fixed and the other end bearing on said balance piston in a direction urging said check valve toward said open position.

19. An empty/load changeover valve device, as recited in claim 7, wherein said means for urging said spool valve member toward said first position is a positioning spring acting between said piston abutment and said spool valve member.

20. An empty/load changeover valve device, as recited in claim 9, further comprising spring means for exerting a force on said balance piston urging said check valve toward said open position thereof, said force varying in accordance with said distance measured by said sensing means in said empty setting of said changeover valve device.

21. An empty/load changeover valve device, as recited in claim 20, wherein said spring means comprises a proportioning spring having one end bearing against said spool valve member and the other end bearing on said balance piston in a direction toward said open position of said check valve.

22. An empty/load changeover valve device, as recited in claim 21, further comprising:
    (a) an equalizing reservoir; and
    (b) said empty/load valve means further establishing fluid pressure communication between said inlet passage and said equalizing reservoir in said empty setting of said changeover valve device, and for venting said equalizing reservoir in said load setting.

23. An empty/load changeover valve device, as recited in claim 10, further comprising a balance chamber in said main bore between said spool valve member and said balance piston.

24. An empty/load changeover valve device, as recited in claim 23, further comprising:
    (a) first, second, and third ports opening into said main bore;
    (b) a vent passage connecting said second port to atmosphere;
    (c) a common passage interconnecting said first and third ports;
    (d) a first annular groove surrounding the periphery of said spool valve member; and
    (e) first and second seal ring means encircling the periphery of said spool valve member on the respective opposite sides of said first annular groove so as to be aligned intermediate said first and third ports in said first range of travel of said spool valve member to establish fluid pressure registry between said actuating chamber and said balance chamber, said first and second seal ring means in said second range of travel being aligned axially on the respective opposite sides of said first and second ports to cut off said fluid pressure registry between said actuating chamber and said balance chamber and to establish fluid pressure registry between said balance chamber and atmosphere.

25. An empty/load changeover valve device, as recited in claim 24, further comprising:
    (a) an equalizing reservoir;
    (b) a fourth port opening into said main bore;
    (c) an equalizing passage between said fourth port and said equalizing reservoir;
    (d) a second annular groove surrounding the periphery of said spool valve member adjacent said second seal ring means;
    (e) a connecting passage between said stepped bore and said second annular groove; and
    (f) third seal ring means encircling the periphery of said spool valve member on the side of said second annular groove opposite said second seal ring means, said first and second seal ring means in said first range of travel being axially aligned on the respective opposite sides of said second and fourth ports to establish fluid pressure registry between said equalizing reservoir and atmosphere, said second seal ring means in said second range of travel of said spool valve member being axially aligned intermediate said second and fourth ports to cut off said fluid pressure registry between said equalizing reservoir and atmosphere and to establish fluid pressure registry between said stepped bore and said equalizing reservoir.

26. An empty/load changeover valve device, as recited in claim 25, wherein said second seal ring means comprises a pair of axially-spaced annular seal rings, each axially aligned relative to said fourth port so as to lie on opposite sides thereof when said spool valve member is in a deadband zone between said first and second ranges of travel thereof.

27. An empty/load changeover valve device, as recited in claim 26, wherein said first seal ring means comprises a pair of axially-spaced annular seal rings, each axially aligned relative to said first port so as to lie on opposite sides thereof when said spool valve member is in said deadband zone between said first and second ranges of travel thereof.

28. An empty/load changeover valve device, as recited in claim 21, wherein the axial dimension of said deadband zone corresponds to the distance between said pair of axially-spaced annular seal rings comprising respective ones of said first and second seal ring means.

29. An empty/load changeover valve device, as recited in claim 22, wherein said load sensing means further comprises an adjusting screw on said sensing arm engageable with said other of said sprung and unsprung members at said changeover point therebetween when said spool valve member is in said deadband zone.

30. An empty/load changeover valve device, as recited in claim 16, further comprising spring means for exerting a force on said balance piston urging said check valve toward said open position thereof, said force varying in accordance with said distance measured by said sensing means in said empty setting of said changeover valve device.

31. An empty/load changeover valve device, as recited in claim 30, wherein said spring means comprises a proportioning spring having one end bearing against said end plug of said spool valve member and the other end bearing on said balance piston in a direction toward said open position of said check valve.

* * * * *